March 22, 1966 V. A. MASSARO 3,242,443

MODULATOR FOR PRODUCING AMPLITUDE VARIATION OF A CARRIER SIGNAL

Filed Sept. 12, 1962

INVENTOR.
VINCENT A. MASSARO
BY
[signature]
ATTORNEY

United States Patent Office 3,242,443
Patented Mar. 22, 1966

3,242,443
MODULATOR FOR PRODUCING AMPLITUDE VARIATION OF A CARRIER SIGNAL

Vincent A. Massaro, Jersey City, N.J., assignor to The Bendix Corporation, Teterboro, N.J., a corporation of Delaware Filed Sept. 12, 1962, Ser. No. 223,102
7 Claims. (Cl. 332—43)

Figure 1:
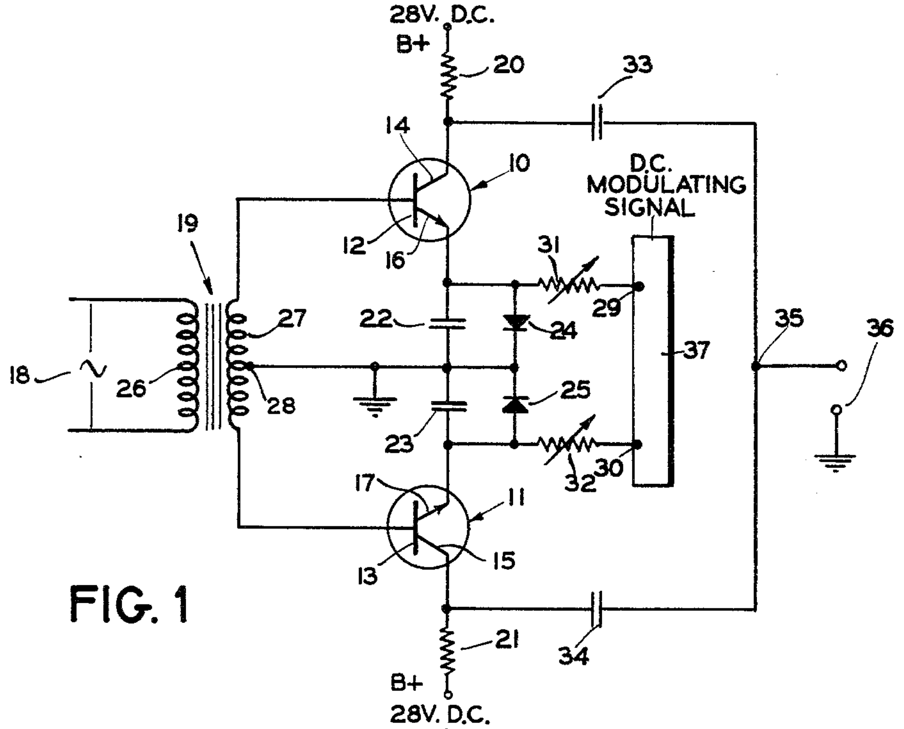

This invention relates to modulators, and more particularly to modulators which produce undistorted sinusoidal output voltage.

In the past, where transistor modulators for frequencies in the order of 400 cycles were used, output waveforms contained sufficient harmonic distortion to require an additional shaping stage in order to provide a sinusoidal output waveform. Such modulators could not be used where it was necessary to vary the 400 cycle reference voltage because the 400 cycle output did not vary proportionately. Thus, when it was necessary to vary the 400 cycle reference voltage, other types of modulators, such as magnetic modulators, had to be used. However, these modulators have a poor yield percentage, and have hysteresis problems which cause the null to change. They are also quite expensive to build. Therefore, one object of this invention is to provide a transistorized modulator having a clean sinusoidal output which varies linearly with input signal variation.

Another object of this invention is to provide a rugged, lightweight, stable modulator which is simple in construction and compact in design.

Another object of this invention is to provide a transistorized modulator having a high dynamic range, low null, and low power consumption and heat dissipation requirements.

Another object of this invention is to provide a transistorized modulator which varies the amplitude of a carrier signal linearly with either A.C. or D.C. signal variation.

The invention contemplates a modulator for producing amplitude variation of a carrier signal comprising a pair of amplifiers each having input, output, and control means, means connecting a carrier signal to the input means of both amplifiers, means connecting a modulating signal to the control means of both amplifiers, and means coupling the output means of both amplifiers to a common output means for providing an output signal with amplitude varying linearly with modulating signal amplitude.

The foregoing and other objects and advantages of the invention will now appear more fully hereinafter from a consideration of the detailed description which follows, taken together with the accompanying drawing wherein two embodiments of the invention are illustrated by way of example. It is to be expressly understood, however, that the drawing is for illustration purposes only and is not to be construed as defining the limits of the invention.

Figure 2:
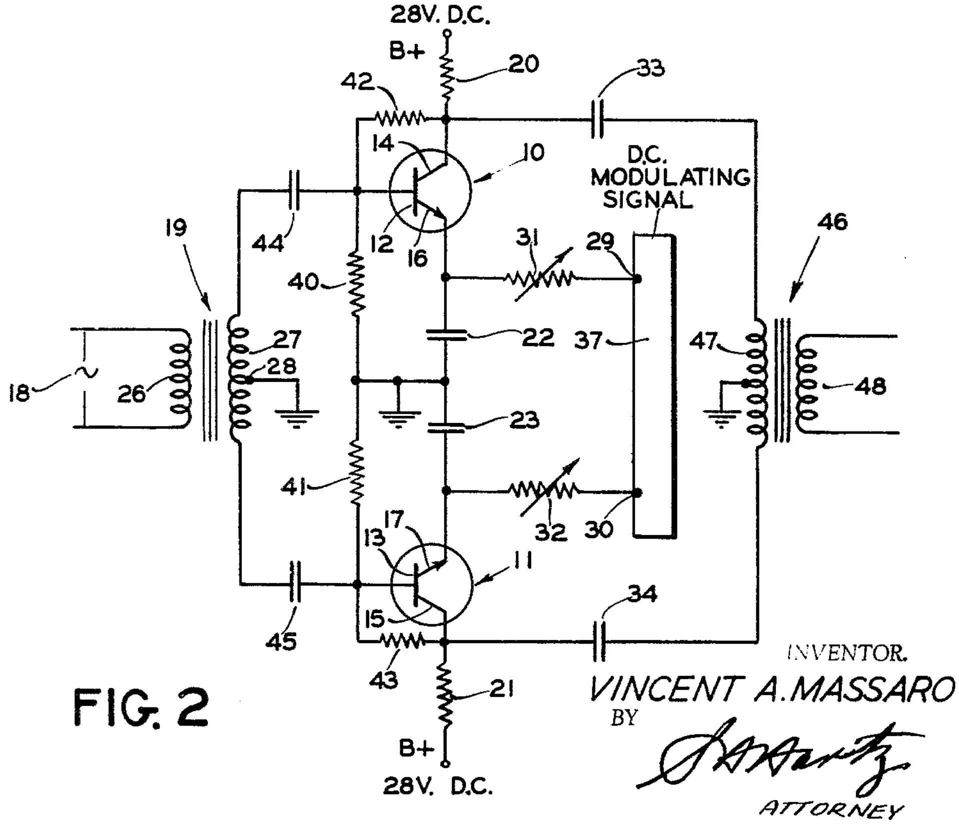

In the drawings:

FIGURE 1 is a circuit diagram of a preferred embodiment of a novel modulator constructed in accordance with the invention; and FIGURE 2 is a circuit diagram of a second embodiment of the novel modulator.

Referring now to FIGURE 1, a pair of transistors 10 and 11 having bases 12 and 13, collectors 14 and 15, and emitters 16 and 17, respectively, are connected in a common emitter configuration. An A.C. carrier signal source 18, such as a 400 cycle signal source, is coupled to the bases 12 and 13 of transistors 10 and 11, respectively, through an injut transformer 19 having a primary 26, and a secondary 27 grounded at its midpoint 28. Collector bias is applied from a source designated 28 v. D.C. B+ to the collectors 14 and 15 through load resistors 20 and 21, respectively. Emitter 16 is A.C. grounded through a capacitor 22, and emitter 17 is A.C. grounded through a capacitor 23. Unidirectional conducting means, such as a diode 24, is connected in the forward direction from emitter 16 to ground, and unidirectional conducting means, such as a diode 25, is connected in the forward direction from emitter 17 to ground. These diodes are polarized so as to prevent the emitters from receiving a large positive bias which could damage the transistors. A pair of modulator terminals 29 and 30 of a modulating signal source 37 are connected to emitters 16 and 17 through balancing resistors 31 and 32, respectively, and are adapted to receive the D.C. modulating signal. The balancing resistors insure that emitter voltages produced by the modulating signal have equal amplitudes by properly attenuating the modulating signal. Coupling capacitors 33 and 34 are connected to collectors 14 and 15, respectively, and to a common terminal 35. The output signal is picked off at terminal 35 and grounded terminal 36.

Transistors 10 and 11 operate as separate amplifiers biased at cutoff. An alternating current carrier signal is applied from source 18 through center tapped transformer 19 to the base of each transistor so that the carrier signal applied to one base is 180° out of phase with respect to ground with that applied to the other base.

Due to the cutoff condition of both transistors, no alternating current voltage appears at output terminals 35, 36 until a modulating signal is applied to one of the emitters from modulator terminals 29 or 30. Depending upon the polarity of the modulating signal, one of the transistors will be driven from cutoff to conduction. The transistor driven from cutoff will amplify the alternating current carrier signal in proportion to the amplitude of the modulating signal applied across terminals 29 and 30. The other transistor will remain cut off because of the back biasing effect of the positive portion of the modulating signal even though most of this portion of signal is grounded through diode 24 or 25.

If the modulating signal applied across the modulating terminals 29 and 30 is such that terminal 29 becomes increasingly positive with respect to terminal 30, the voltage on emitter 17 of transistor 11 then becomes increasingly negative with respect to ground, while the voltage on emitter 16 of transistor 10 remains substantially zero, or goes only slightly positive. This effectively raises the collector-to-emitter voltage of transistor 11 while leaving the collector-to-emitter voltage of transistor 10 substantially unchanged. Therefore, transistor 11 is driven out of cut off, while transistor 10 remains cut off. Thus, transistor 11 amplifies the A.C. carrier signal applied to base 13 while transistor 10 remains cut off. The signal appearing across output terminals 35 and 36 is therefore an amplified version of the signal applied to base 13 of transistor 11.

By reversing polarity of the signal applied across terminals 29 and 30, transistor 11 cuts off, and transistor 10 conducts and amplifies the A.C. carrier signal applied to base 12, which is 180° out of phase with the signal applied to base 13 of transistor 11. Keeping either of the amplifiers beyond cut off and varying the A.C. input signal amplitude causes the A.C. output signal amplitude to vary proportionately, while variation of modulating voltage amplitude will control gain of each amplifier and produce linear variation of A.C. output signal amplitude.

Referring next to FIGURE 2 for an explanation of another embodiment of the novel circuit, bias resistors 40 and 41 are connected between base 12 of transistor 10 and ground, and the base 13 of transistor 11 and ground, respectively. Feedback resistors 42 and 43 are connected between collector 14 and base 12 of transistor 10 and collector 15 and base 13 of transistor 11, respectively. The combination of these feedback and bias resistors serve to protect the transistors from excessive collector to emitter voltages, thereby making diodes 24 and 25 of FIGURE 1 unnecessary for protection of the transistors in the circuit of FIGURE 2. A blocking capacitor 44 is connected between the base 12 of transistor 10 and one end of winding 27 of transformer 19, and a blocking capacitor 45 is connected between the base 13 of transistor 11 and the other end of winding 27 of transformer 19. Blocking capacitors are necessary in this embodiment of the circuit in order to prevent direct current from flowing through winding 27 from the 28 v. D.C. B+ source and thereby saturating the transformer. An isolation transformer 46 is shown connected on the output side of the circuit such that its primary winding 47 is connected between capacitors 33 and 34 and is centertapped to ground. A secondary winding 48 provides output voltage of the same frequency as that of the input carrier signal. In all other respects, the configuration and operation of the circuit of FIGURE 2 is similar to that of the circuit of FIGURE 1.

The device provides a transistorized modulator having a clean sinusoidal output which varies linearly in amplitude with amplitude variation of the input signal. It provides a rugged, lightweight, stable modulator, simple in construction and compact in design. The modulator has a high dynamic range, low null, and low power consumption and heat dissipation requirements. The modulating signal can be either A.C. or D.C.

Although two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A linear amplitude modulator comprising a pair of transistors biased at cutoff and each having a base, a collector, and an emitter, means coupling carrier signals of opposite phases to the bases of the transistors, means connecting opposite polarity modulating signals to the emitters of the transistors, and means connecting each emitter to ground so that a modulating signal of one polarity appears on the emitter of one transistor and renders it conducting and a modulating signal of opposite polarity is conducted to ground and substantially no signal appears on the emitter of the other transistor so that the transistor is nonconducting, and means connecting the collectors of both transistors to a common output to provide proportional amplitude variation of the carrier signal with amplitude variation of the modulating signal.

2. A modulator for producing amplitude variation of a carrier signal, comprising a pair of amplifiers biased at cutoff in the absence of a modulating signal and each having input, output, and control means, means connecting carrier signals of opposite phases to the input means of the amplifiers, means connecting D.C. modulating signals of opposite polarity to the control means of the amplifiers, means connecting each control means to ground so that modulating signals of one polarity render one amplifier conducting and substantially no signal appears on the control means of the other amplifier, and means coupling the output means of both amplifiers to a common output for providing an output signal amplitude varying linearly with modulating signal amplitude.

3. In an amplitude modulator for varying the amplitude of a carrier signal in proportion to the amplitude of a modulating signal, the combination comprising a pair of transistors biased at cutoff and each having a base, a collector, and an emitter, means coupling a carrier signal to the base of each transistor, means connecting modulating signals of opposite polarities to the emitters of the transistors, unidirectional conducting means connected between the emitter of each transistor and ground and polarized so that modulating signals of one polarity appear on the emitter of one transistor and render it conducting and modulating signals of opposite polarity are conducted to ground and substantially no signals appear on the emitter of the other transistor, and means connecting the collectors of both transistors to a common output.

4. A modulator for producing amplitude variation of a carrier signal, comprising a pair of amplifiers each having input, output, and control means, a carrier signal source connected to the input means of the amplifiers, a direct current modulating signal source, means conducting modulating signals of opposite polarity to the control means of the amplifiers, unidirectional conducting means connected between the control means of each amplifier and ground and polarized so that modulating signals of one polarity appear on the control means of one amplifier and render the amplifier conducting and substantially no signal appears on the control means of the other amplifier, and means coupling the output means of both amplifiers to a common output for providing an output signal which varies linearly in amplitude with modulating signal amplitude.

5. A linear amplitude modulator comprising a pair of transistors biased at cutoff and each having a base, a collector, and an emitter, an alternating current carrier signal source, means coupling carrier signals of opposite phases to the bases of the transistors, a direct current modulating signal source, means connecting modulating signals of opposite polarities to the emitters of the transistors, and means connecting the collectors of both transistors to common output means to provide proportional amplitude variation of the carrier signal with amplitude variation of the modulating signal.

6. A modulator for producing amplitude variation of a carrier signal, comprising a pair of amplifiers biased at cutoff and each having input, output, and control means, means connecting carrier signals of opposite phases to the input means of the amplifiers, means connecting modulating signals of opposite polarities to the control means of the amplifiers, and means coupling the output means of both amplifiers to a common output for providing an output signal with amplitude varying linearly with modulating signal amplitude.

7. A linear amplitude modulator comprising a pair of transistors biased at cutoff, each transistor having a base, a collector, and an emitter, means coupling a carrier signal to the base of each transistor, means connecting modulating signals of opposite polarity to the emitters of the transistors so that modulating signals of one polarity connected to the emitter of one transistor drive the one transistor to conduct and modulating signals of opposite polarity connected to the emitter of the other transistor maintain the other transistor at cutoff, and means connecting the collectors of both transistors to common output means to provide proportional amplitude variation of the carrier signal with amplitude variation of the modulating signal.

References Cited by the Examiner

UNITED STATES PATENTS

| | | | |
|---|---|---|---|
| 2,941,093 | 6/1960 | Merel | 307—88.5 |
| 3,013,162 | 12/1961 | Antista | 332—31 |
| 3,027,522 | 3/1962 | Boxall et al. | 332—44 |
| 3,112,410 | 11/1963 | Schmid | 307—88.5 |

ROY LAKE, *Primary Examiner.*

ALFRED L. BRODY, *Examiner.*